United States Patent
Douglas

(10) Patent No.: US 8,151,583 B2
(45) Date of Patent: Apr. 10, 2012

(54) EXPANSION VALVE CONTROL SYSTEM AND METHOD FOR AIR CONDITIONING APPARATUS

(75) Inventor: Jonathan David Douglas, Bullard, TX (US)

(73) Assignee: Trane International Inc., Piscataway, NJ (US)

( * ) Notice: Subject to any disclaimer, the term of this patent is extended or adjusted under 35 U.S.C. 154(b) by 708 days.

(21) Appl. No.: 11/888,521

(22) Filed: Aug. 1, 2007

(65) Prior Publication Data

US 2009/0031740 A1  Feb. 5, 2009

(51) Int. Cl.
*F25B 41/04* (2006.01)
*F25B 49/02* (2006.01)

(52) U.S. Cl. ............... 62/222; 62/225; 62/157; 62/158; 62/159; 62/160

(58) Field of Classification Search ................... 62/225, 62/157, 158, 159, 160, 222
See application file for complete search history.

(56) References Cited

U.S. PATENT DOCUMENTS

| | | | |
|---|---|---|---|
| 4,410,132 A | 10/1983 | Levine | |
| 4,484,452 A | 11/1984 | Houser, Jr. | |
| 4,527,399 A | 7/1985 | Lord | |
| 4,573,326 A | 3/1986 | Sulfstede et al. | |
| 4,725,001 A | 2/1988 | Carney et al. | |
| 4,928,494 A | 5/1990 | Glamm | |
| 5,000,009 A | 3/1991 | Clanin | |
| 5,009,075 A | 4/1991 | Okoren | |
| 5,224,354 A | 7/1993 | Ito et al. | |
| 5,303,562 A * | 4/1994 | Bahel et al. ................ | 62/222 |
| 5,475,986 A | 12/1995 | Bahel et al. | |
| 5,632,154 A | 5/1997 | Sibik et al. | |
| 5,791,155 A * | 8/1998 | Tulpule .................... | 62/211 |
| 5,809,794 A | 9/1998 | Sibik et al. | |
| 6,050,098 A | 4/2000 | Meyer et al. | |
| 6,453,690 B1 * | 9/2002 | Kim ......................... | 62/222 |
| 6,658,373 B2 | 12/2003 | Rossi et al. | |
| 6,679,072 B2 | 1/2004 | Pham et al. | |
| 6,685,441 B2 * | 2/2004 | Nam ......................... | 417/292 |
| 6,701,725 B2 | 3/2004 | Rossi et al. | |
| 6,951,116 B2 * | 10/2005 | Lee et al. .................. | 62/175 |
| 7,290,402 B1 * | 11/2007 | Bailey ....................... | 62/225 |
| 2004/0068999 A1 * | 4/2004 | Jessen ....................... | 62/222 |
| 2006/0248908 A1 * | 11/2006 | Yamasaki et al. .......... | 62/228.1 |
| 2009/0230203 A1 * | 9/2009 | Matsui et al. .............. | 236/44 A |

OTHER PUBLICATIONS

Hata, Y. JP 2003004312 (English Abstract).*
Mercer, Kevin B., et al.; U.S. Appl. No. 12/895,536, filed Sep. 30, 2010; Title: Expansion Valve Control System and Method for Air Conditioning Appartus.

* cited by examiner

*Primary Examiner* — Cheryl J Tyler
*Assistant Examiner* — Jonathan Bradford
(74) *Attorney, Agent, or Firm* — Conley Rose, P.C.; J. Robert Brown, Jr.

(57) ABSTRACT

A vapor compression air conditioning system includes a motor operated expansion valve and control unit including sensors for determining the amount of superheat of the working fluid at or adjacent to the compressor inlet. Expansion valve position is adjusted to maintain a predetermined amount of superheat. The sensors may sense working fluid evaporator temperature and temperature downstream of the evaporator. Dual motor operated expansion valves may be disposed in the working fluid conduit between the heat exchangers in a reversible system. In operation, the expansion valve position may be set as a function of ambient temperature, a previous position, and predetermined superheat requirements to minimize liquid ingestion by the compressor.

24 Claims, 6 Drawing Sheets

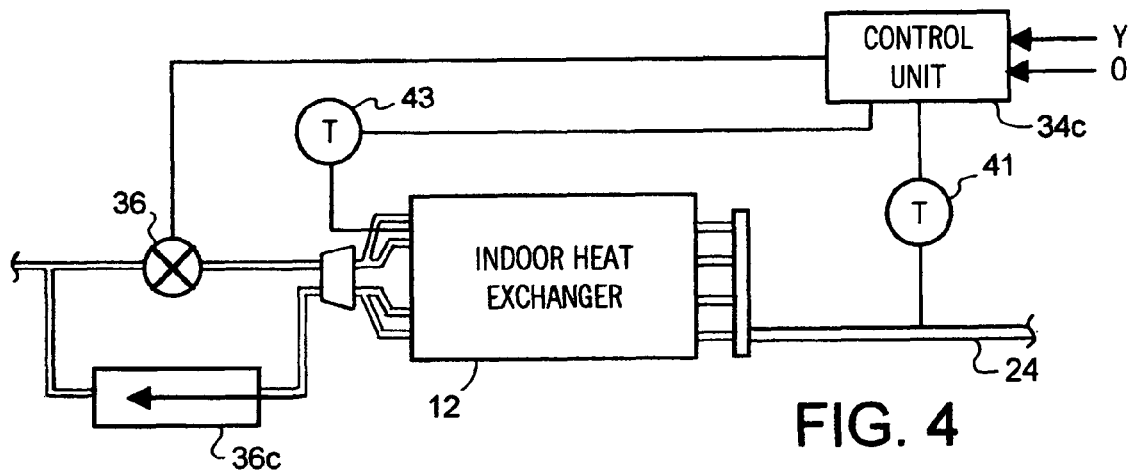
FIG. 4
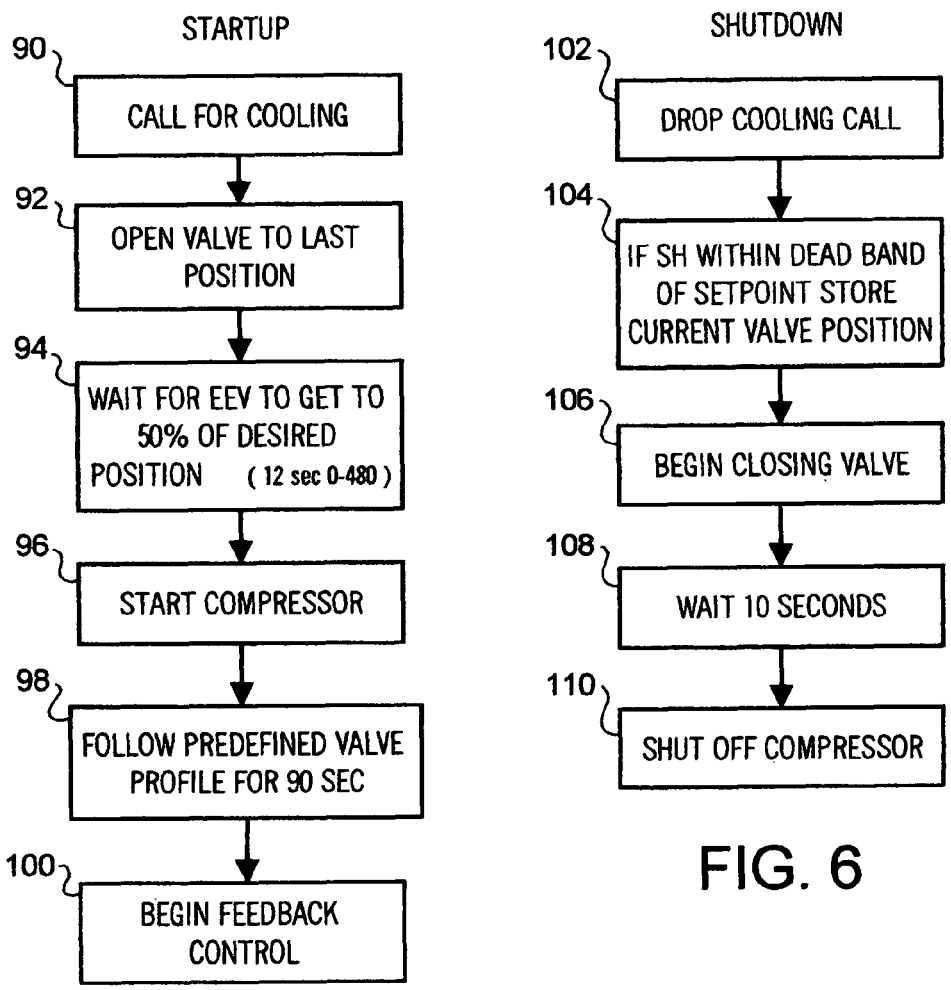
FIG. 5
FIG. 6

| Time (sec) | Relative Position | Weight |
|---|---|---|
| 0 | 120 | 100 |
| 10 | 120 | 100 |
| 20 | 120 | 100 |
| 30 | 110 | 100 |
| 40 | 105 | 100 |
| 50 | 105 | 100 |
| 60 | 100 | 100 |
| 70 | 100 | 90 |
| 80 | 100 | 80 |
| 90 | 100 | 70 |
| 100 | 100 | 60 |
| 110 | 100 | 50 |
| 120 | 100 | 40 |
| 130 | 100 | 30 |
| 140 | 100 | 20 |
| 150 | 100 | 10 |
| 160 | 100 | 0 |
| 170 | 100 | 0 |
| 180 | 100 | 0 |

EXPANSION VALVE CONTROL SYSTEM AND METHOD FOR AIR CONDITIONING APPARATUS

BACKGROUND OF THE INVENTION

In the art of vapor compression type heating, ventilating and air conditioning (HVAC) equipment, there has been a continuing need to provide a suitable expansion device which may be reliably controlled to minimize the chance of damage to the system compressor resulting from liquid working fluid entering the compressor, maintain the ability during steady state operation to adjust working fluid flow to meet system requirements and to otherwise protect the compressor from damage during system shutdown or during periods of continuous low compressor suction pressure or a low super-heat condition of the working fluid.

Although prior efforts have been made to provide so-called motorized or power operated expansion valve devices in commercial sizes of air conditioning equipment, such devices and associated controls have not been economically practical, reliable in operation, nor able to provide suitable control over refrigerant fluid flow to control superheat at the compressor inlet for lower capacity (1 to 5 ton) configurations of vapor compression type air conditioning equipment. It is to overcome these deficiencies associated with prior art systems and methods that the present invention has been developed.

SUMMARY OF THE INVENTION

The present invention provides an improved air conditioning apparatus or system including an electronic control system for controlling the refrigerant working fluid expansion valve to control fluid superheat prior to introducing the fluid to the system compressor. The present invention also provides an improved method of controlling working fluid flow in a vapor compression type air conditioning system to minimize the chance of damage to the system compressor during certain phases of operation.

In accordance with one aspect of the present invention, a vapor compression type air conditioning system is provided with a motor controlled expansion valve which is responsive to a controller which includes temperature and/or pressure sensors suitably positioned on the apparatus for controlling refrigerant or working fluid flow. Refrigerant or so-called working fluid flow is controlled such that working fluid in the liquid phase will not likely enter the system compressor by providing for a predetermined amount of superheat of the fluid at or upstream of the compressor inlet port. The expansion valve controller or control system includes a control circuit operably connected to an electric stepper motor type expansion valve. The control circuit is also in communication with plural temperature sensors or a combination of temperature and pressure sensors for measuring working fluid condition during operation of the system. The temperature sensors may comprise a so-called outdoor temperature sensor, a temperature sensor for sensing the temperature of the working fluid downstream of the evaporator or evaporating heat exchanger and upstream of the compressor inlet port or a combination of temperature sensors, together with a sensor which determines the status of the compressor (on or off).

The present invention also provides a control system for a vapor compression type air conditioning apparatus or system for controlling working fluid superheat according to a preferred control algorithm or method which provides for valve control during system startup, steady state operation and system shutdown. On system startup, for example, a method in accordance with the invention provides a predetermined position of the expansion valve and a predetermined delay in startup of the system compressor or compressors.

A method in accordance with the invention provides, during steady state operation, for an estimate of future changes in evaporator temperature based on historical changes in expansion valve position, and adjustments to valve position are made based on a novel procedure. Still further, the invention contemplates the provision of an improved system shutdown procedure wherein the expansion valve is closed prior to compressor shutdown and the compressor is de-energized at a predetermined change in evaporator temperature to reduce the chance of liquid ingestion into the compressor during a following starting cycle.

Still further, the invention provides for compressor protection in accordance with procedures which monitor fluid inlet conditions at the compressor to protect the compressor against failures of the expansion valve and other major components, such as fan motors, and improper refrigerant fluid charge level.

Those skilled in the art will further appreciate the above-mentioned advantages and features of the invention together with other important aspects thereof upon reading the detailed description which follows in conjunction with the drawings.

BRIEF DESCRIPTION OF THE DRAWINGS

FIG. 4 is a detailed schematic diagram showing a preferred location of temperature sensors in relation to a heat exchanger or so-called evaporator apparatus comprising part of a system of the present invention;

FIG. 5 is a generalized flow diagram in accordance with one method of the invention;

FIG. 6 is a generalized flow diagram also in accordance with one method of the invention;

DETAILED DESCRIPTION OF THE PREFERRED EMBODIMENTS

Figure 1:
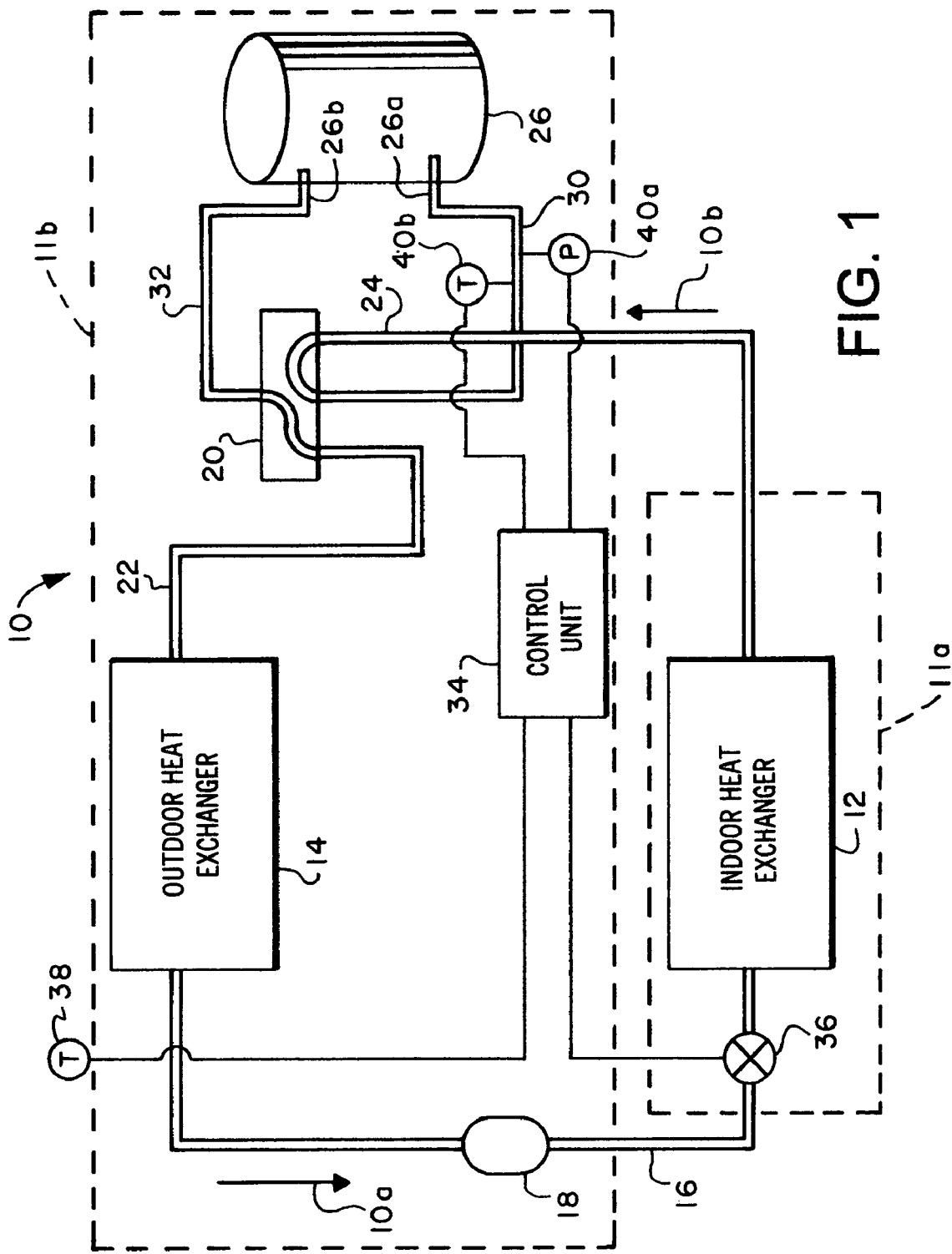
FIG. 1 is a schematic diagram of one preferred embodiment of an air conditioning apparatus or system including an expansion valve and control system in accordance with the invention.

In the description which follows like elements are marked throughout the specification and drawings with the same reference numerals, respectively. The drawing figures may be shown in somewhat generalized schematic form in the interest of clarity and conciseness.

Referring to FIG. 1, there is illustrated a schematic diagram of an air conditioning apparatus or system, generally designated by the numeral 10. Apparatus 10 may be configured as a so-called heat pump or a reversible air conditioning apparatus which is operable to provide both cooling of an enclosed space and heating of the space. In the configuration of the apparatus or system 10, it is operating as a so-called air conditioner or in a cooling mode, and includes a so-called indoor unit 11a in communication with an enclosed space, not shown, for which air is circulated by a motor driven fan, also not shown, and in contact with an indoor heat exchanger or indoor coil 12.

The apparatus 10 also includes an outdoor unit 11b including a heat exchanger or so-called outdoor coil 14. Heat exchangers 12 and 14 are interconnected by a conduit 16, including a refrigerant fluid bidirectional filter and dryer apparatus 18 of a suitable type. Heat exchangers 12 and 14 are also operably connected to a so-called switchover or reversing valve 20 by way of conduits 22 and 24. Switchover valve 20 is also operably connected to a compressor 26. Compressor 26 is connected to a refrigerant or working fluid conduit 30 at an inlet port 26a. Compressor 26 is also connected to a conduit 32 for discharging heated, pressure gas thereto, via a port 26b. Those skilled in the art will recognize that the system 10 as well as other systems described herein may include a single compressor such as compressor 26 or two or more compressors or one or more variable capacity compressors or combinations thereof. Conventional controls for operating the compressor 26, including a so-called thermostat, are not illustrated in FIG. 1. However, FIG. 1 does illustrate a control unit, generally designated by the numeral 34, for controlling an electronic motorized expansion valve 36. Expansion valve 36 is interposed heat exchangers 12 and 14 in conduit 16 for controlling fluid flowing from heat exchanger 14 to the heat exchanger 12. The direction of fluid flow in the apparatus 10, in the position of valve 20, as indicated, is in accordance with the arrows 10a and 10b in FIG. 1. Expansion valve 36 may be disposed in indoor unit 11a, as shown, or interposed in conduit 16 in outdoor unit 11b. Still further, the indoor and outdoor units 11a and 11b may be combined in one cabinet as a so-called package unit known to those skilled in the art. Control unit 34 is also operably in communication with an outdoor temperature sensor 38 and respective pressure and temperature sensors 40a and 40b. Sensors 40a and 40b are operable to measure the pressure and temperature of the working fluid flowing through conduit 30 to the compressor inlet 26a.

The control unit 34 includes a programmable microprocessor which will be explained in further detail hereinbelow. Basically, the control unit 34 will interface with the standard controls for the apparatus 10 for controlling the operation of the valve 36 so that a suitable amount of superheat condition of the working fluid exists as the fluid leaves the heat exchanger or evaporator 12 and flows through conduits 24 and 30 so as to prevent or minimize the flow of liquid working fluid through these conduits and which may be ingested by the compressor 26. Moreover, control of the valve 36 may be carried out in other modes of operation to minimize the risk of liquid ingestion into the compressor 26.

For example, at startup of the apparatus 10, control unit 34 may be operated to at least partially open valve 36 prior to energization of the compressor 26. Moreover, at compressor startup the valve 36 may also be controlled as to its fluid flow controlling position as a function of the ambient outdoor temperature, as determined by sensor 38. During steady state operation, the valve 36 may be continuously adjusted based on a weighted history of recent valve positions and also based on the working fluid temperature and pressure sensed by the sensors 40a and 40b, so as to maintain the requisite amount of superheat of the fluid flowing to the compressor inlet. Still further, the apparatus 10 may be shutdown, that is the compressor motor de-energized, in response to defined periods of continuous low fluid superheat and defined periods of continuous low pressure in conduit 30 leading to the compressor inlets.

One preferred mode of operation of the system or apparatus 10 may also be based on startup or initializing the position of valve 36 by estimating the operating evaporator temperature and the operating condensing temperature by adding a constant value to the outdoor temperature sensed by the sensor 38. The estimated working fluid evaporating temperature and condensing temperature are applied to a so-called compressor map to obtain an estimate of the refrigerant or working fluid mass flow and the starting position of the valve 36 may be calculated using a mathematical model of the expansion valve to find the valve position corresponding to the calculated mass flow. Thus, the control unit 34 may begin to move the valve 36 to its initial position and the compressor 26 is not started until the valve has reached fifty percent of its initial position, for example. Once an evaporator temperature has stabilized, the control unit 34 enters a so-called steady state mode of operation.

During steady state operation, a predetermined timeline history of change in valve position may be maintained, such as every three minutes. At predetermined intervals, such as every 2.5 seconds, history points are multiplied by a weighting array and more recent points are weighted higher than points further in the past so that the sum of the history points, multiplied by the weighting array is an estimation of expected future changes in the evaporator temperature. By way of example, adjustments to the valve position (DStep) may be made using the following equation:

$$D\text{Step} = (ET_{goal} - ET + \text{future } ET)/\text{gain}$$

The gain may be expressed as the change in the temperature at the evaporator inlet, otherwise known as evaporator temperature (ET), per valve step and is a function of valve position. Gain versus valve position may be calculated by matching the refrigerant or working fluid flow from the aforementioned compressor map to that of the valve at various operating points. Gain may be predetermined and stored in the control unit or controller in tabular form as a function of valve position. It is significant to note that the gain is only a function of valve position and is independent of compressor size.

The "evaporator temperature goal" ($ET_{goal}$) is based on current superheat conditions. Using experimental data, a table may be created listing the change in evaporator temperature (ET) required to reach 10° F. of superheat, for example.

On shutdown of the apparatus 10, the control unit 34 may be operated to record the current evaporator temperature (ET) and cause closure of valve 36 prior to shutting down the compressor 26. In this way the compressor is turned off when the current evaporator temperature is at least one degree below the evaporator temperature prior to shutdown and a slight pump-down reduces the chance of flooding of the compressor with liquid refrigerant fluid on the next startup of the apparatus 10.

In the event of failure of the control unit 34 to maintain superheat at a predetermined value, an additional process may involve monitoring the fluid inlet conditions of the compressor 26 to protect the compressor against failure if the valve 36 should fail to operate properly or other key components should fail to operate properly, such as the condenser or evaporator fan motors, or other apparatus, causing the flow of heat exchange fluid across the heat exchangers 12 or 14, or there exists an insufficient charge of working refrigerant fluid in the system or apparatus 10.

Since low working fluid superheat is an indication of liquid returning to the compressor 26 via the conduit 30, such a condition is continuously monitored with the sensors 40a and 40b and a warning signal may be registered after a predetermined period of continuous low superheat. For example, after a predetermined period of continuous low superheat, the control unit 34 may send a signal to the main control unit for the compressor 26 of system 10 for executing a shutdown signal. Also, for example, low suction pressure in conduit 30 indicates low refrigerant fluid mass flow and low mass flow does not provide sufficient cooling which will cause compressor damage due to overheating. In the heating mode of operation in an apparatus, such as the apparatus 10, the evaporator temperature (ET) varies with the outdoor ambient temperature and a warning signal may be issued when the evaporator temperature, as calculated from compressor suction pressure, is more than a predetermined amount below the ambient outdoor temperature, such as 30° F., for example.

Still further, faulty operation of other key components in an apparatus or system, such as the apparatus 10, may be detected using compressor suction pressure or temperature, as determined by the sensors 40a and 40b, and the ambient temperature sensor 38 in conjunction with the position of the valve 36. Since performing diagnostics on a system, such as that illustrated in FIG. 1, typically requires knowledge of the pressures in the conduit 30, as well as conduit 32, the pressure in the conduit 32 can be estimated based on the measured pressure in the conduit 30. System faults and symptoms thereof may be tallied based on evaporator temperature, the superheat condition, and the so-called high-side working fluid pressure in conduit 32. For example, a failure of a motor driven fan to blow sufficient air over the heat exchanger or condenser 14 results in high pressure in conduits 32 and 22 which can be determined based on measuring the pressure in conduit 30 by sensor 40a. Failure of a motor driven fan to blow sufficient air over the heat exchanger or evaporator coil of heat exchanger 12 results in a low evaporator temperature. A low refrigerant fluid charge in system 10 results in both a low evaporator temperature and a low high-side pressure in conduits 22 and 32.

Still further, if a compressor is not pumping fluid sufficiently, the evaporator temperature will become high and the high-side working fluid pressure will, of course, become low. If there is a liquid line restriction in conduit 16 or valve 36 is stuck closed, the evaporator temperature will be low and the superheat condition will be high, while the high-side pressure will be normal. In the event of the valve 36 being stuck in a wide-open or almost fully open condition, the evaporator temperature will be normal, but the superheat condition, as determined from sensors 40a and 40b, will be low while the high-side pressure in conduits 32 and 22 will be normal.

Another benefit of motor operated expansion valve 36 and a control unit therefor, such as the control unit 34, is that valve 36 can be purposely controlled to be in the wide-open position, thereby functioning as a check valve when the system 10 is running with the working fluid flowing in the so-called opposite direction, that is wherein the heat exchanger 12 acts as a condenser and the heat exchanger 14 acts an evaporator. This condition of operation is also, essentially known as the "heat pump" mode of operation or "heating mode".

Figure 2:
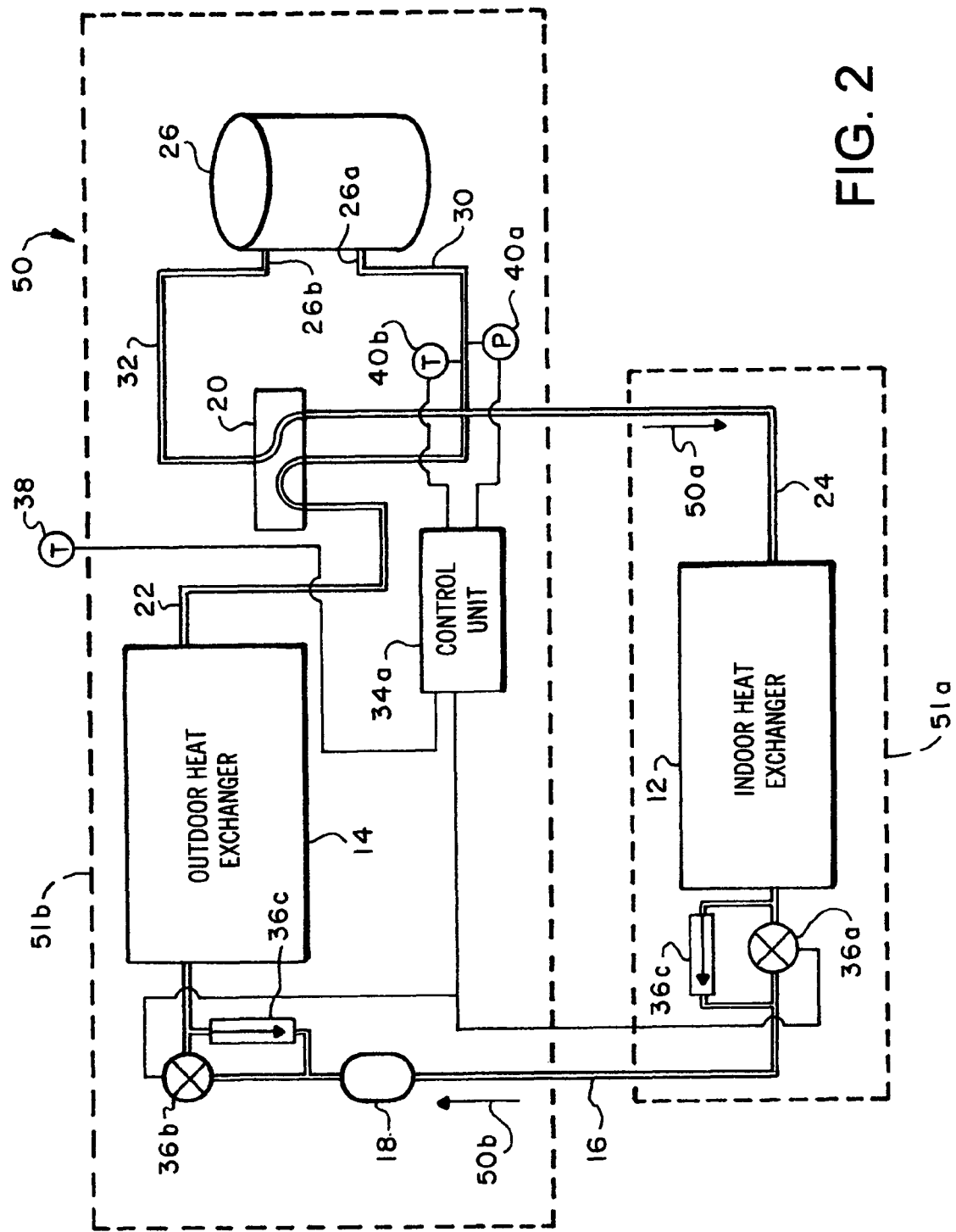
FIG. 2 is a schematic diagram similar in some respects to the diagram of FIG. 1 and illustrating a first alternate embodiment of the invention.

Referring now to FIG. 2, there is illustrated another embodiment of a system or apparatus in accordance with the invention and generally designated by the numeral 50. The apparatus or system 50 also includes an indoor unit 51a and an outdoor unit 51b. Apparatus or system 50 also includes a compressor 26, heat exchangers 12 and 14 connected to the compressor by way of a reversing or switchover valve 20, and conduits 16, 24, 30, 32 and 22, as illustrated. Pressure and temperature sensors 40a and 40b are operably associated with conduit 30 leading to compressor inlet 26a for measuring the pressure and temperature of the refrigerant working fluid flowing therethrough. Sensors 40a and 40b are operable to provide signals to a control unit 34a which is in communication with motor controlled expansion valves 36a and 36b, both interposed in conduit 16 and both operable to function as check valves, as indicated by the symbols 36c. Control unit 34a may communicate with valves 36a and 36b via one or more modes of communication including hardwiring, radio frequency signal transmission or optical signal transmission, for example. Apparatus 50 thus operates as a heat pump, which is the condition illustrated, and enjoys all of the advantages of the apparatus 10. When operating in a cooling mode, motor controlled expansion valve 36a is regulated to provide the requisite amount of superheat of the fluid flowing through conduit 30 while expansion valve 36b is held in a wide-open position to function as a so-called integrated check valve, indicated by symbol 36c. Conversely, when the apparatus 50 is operating as a heat pump, heat exchanger 12 is rejecting heat to a suitable enclosed space and expansion valve 36a is held in a wide-open position while expansion valve 36b is controlled by control unit 34a to provide the requisite amount of superheat for working fluid flowing from conduit 22 to reversing or switchover valve 20 and then to conduit 30.

Figure 3:
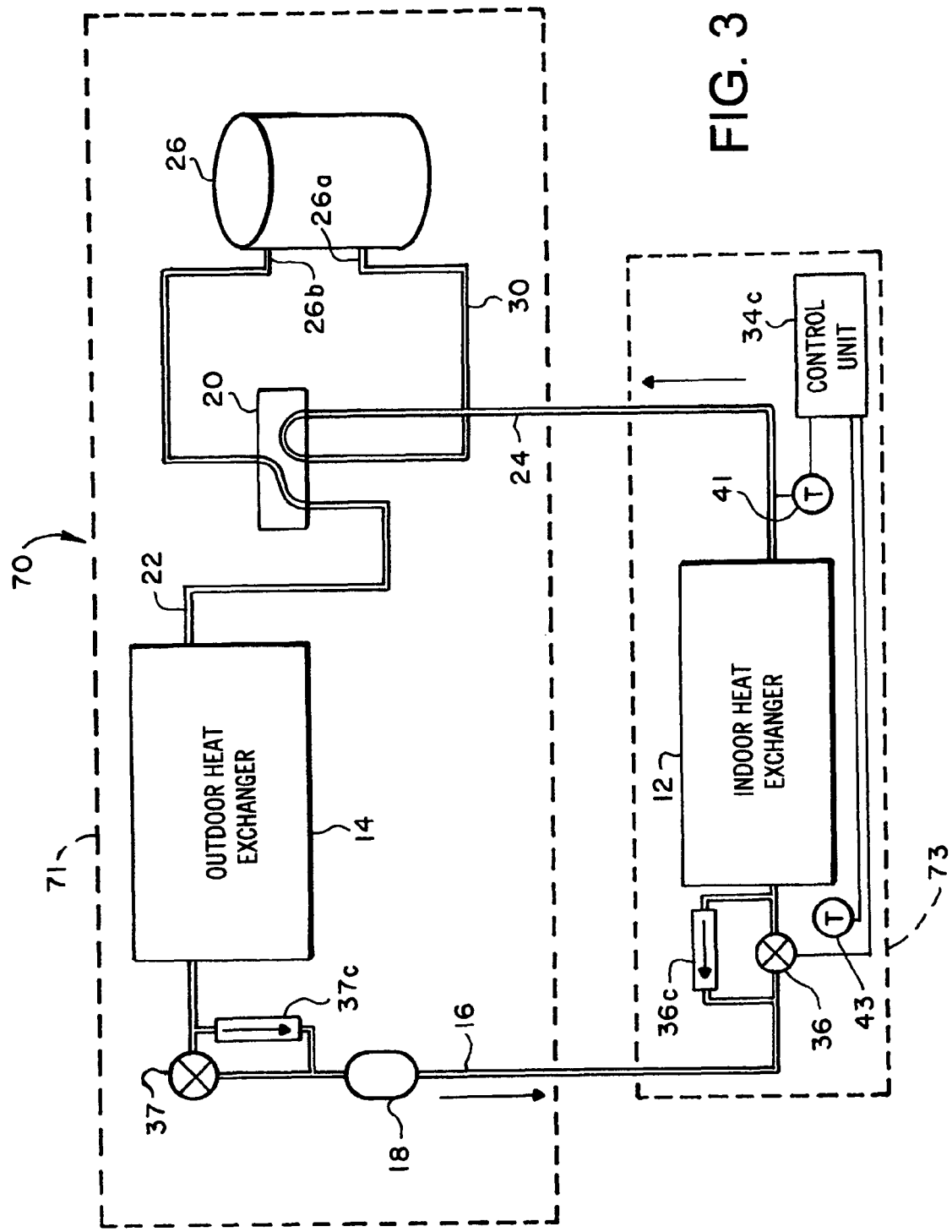
FIG. 3 is a schematic diagram similar to FIGS. 1 and 2 and illustrating a second alternate embodiment of the invention.

Referring now to FIG. 3, yet another preferred embodiment of the invention is illustrated and generally designated by the numeral 70. Apparatus or system 70 includes elements included in the embodiments of FIGS. 1 and 2, as indicated by the corresponding reference numerals. However, the system 70 is provided with two temperature Sensors 41 and 43 which measure temperature at selected locations with respect to and generally at the heat exchanger 12. The embodiment of FIG. 3 also includes a thermal type expansion valve 37 interposed in liquid line 16 and including a conventional check valve 37c. Accordingly, the amount of superheat of the fluid flowing through conduits 24, valve 20 and conduit 30 is determined by measuring temperatures at sensors 41 and 43 instead of a temperature and pressure measurement in conduit 30.

In the embodiment of FIG. 3, the so-called outdoor unit, comprising the components illustrated within the envelope 71, is provided with a thermal expansion valve for operation in the heating mode, as indicated by the expansion valve 37, while motor controlled expansion valve 36 is utilized on an indoor unit comprising the components illustrated within envelope 73 and which includes heat exchanger 12, and a control unit 34c, similar to control units 34 and 34a.

Referring briefly to FIG. 4, there is illustrated a more detailed configuration of the heat exchanger 12 and preferred locations of temperature sensors 41 and 43 as well as expansion valve 36. The location of sensor 43, which is typically in the two-phase region of fluid flow into and through the heat exchanger 12, measures the so-called evaporator temperature (ET) and, together with the sensor 41, enables the determination of the amount of superheat of the fluid flowing to the compressor via the conduits 24 and 30, for example. Other locations of the sensors 41 and 43 on the heat exchanger 12 may be suitable.

Referring to FIG. 5, there is illustrated a flow diagram of major steps for startup of an apparatus or system in accordance with one embodiment of the invention. As mentioned previously, upon a "call" for cooling or heating by a thermostat controller not shown, but associated with the control unit 34, 34a or 34c, as indicated by step 90, the motor controlled expansion valve 36, 36a or 36b would be open to the same position as the last position in a previous operating cycle, as indicated at step 92. This step would be followed by step 94 which is a timing step to wait until the valve 36, 36a or 36b is moved to at least 50% of the desired open position of the valve, which may take as long as twelve seconds for suitable commercially available versions of the valve, as indicated at step 94. Once the expansion valve 36, 36a or 36b has opened to the 50% open position, the compressor 26 and/or 28 would be started, as indicated at step 96, followed by a step 98 in which a valve positioning profile would be that which might be predefined and programmed in the controller 34, 34a or 34c. After following the predefined valve movement profile for ninety seconds, for example, as indicated by step 98, a feedback control mode would be carried out at step 100 during steady state operation of the associated system or apparatus.

As shown in FIG. 6, once a cooling or heating "call" has been satisfied at a step 102, if the superheat condition of the fluid flowing toward the compressor 26 and/or 28 was within a so-called dead band of the setpoint of superheat, the current position of valve 36, 36a, 36b would be stored in a memory of the control unit 34, 34a or 34c, as indicated at step 104. Step 104 would be followed by a step 106 of closing the expansion valve 36, 36a or 36b followed by step 108 which would be a time of approximately ten seconds, for example, followed by shutdown of compressor 26 and/or 28 at step 110.

Figures 7, 9:
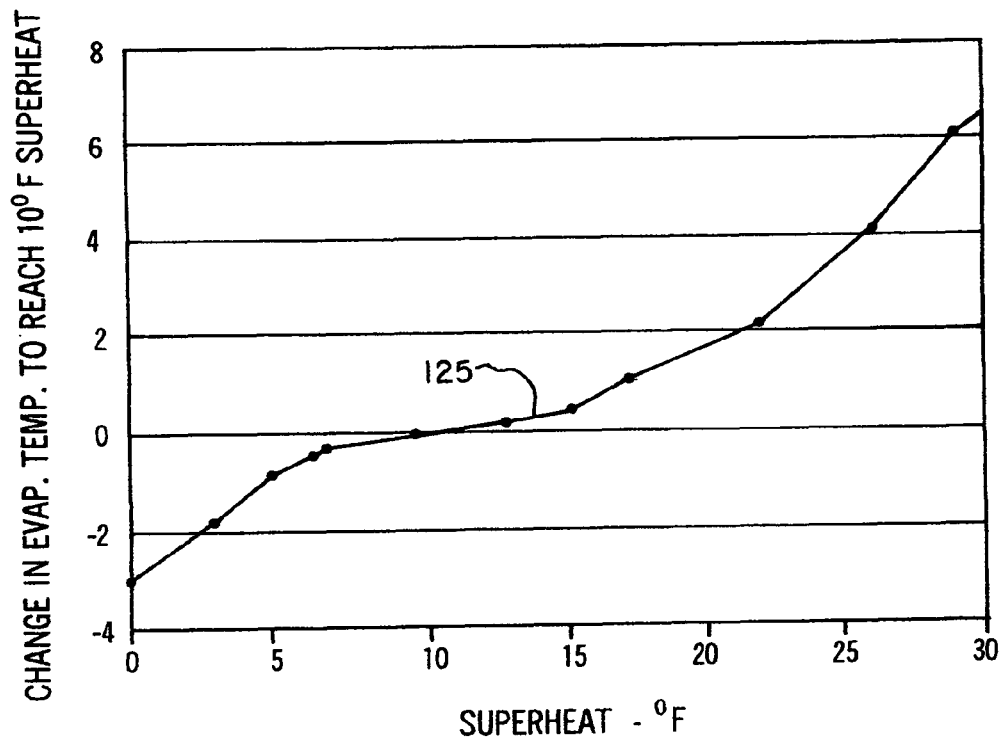
FIG. 7 is a table illustrating certain features in connection with another method of the invention.
FIG. 9 is a diagram showing change in evaporator temperature required to achieve predetermined superheat of the working fluid.

Referring now to FIG. 7, there is illustrated a table of values of time in seconds, the position of the expansion valve 36, 36a or 36b as a percent open relative to the initial starting position of the valve. The column entitled "weight" is a set of values related to a fixed profile of valve position relative to a feedback control signal. A weight of 100, for example, indicates that one hundred percent of valve control will be due to a fixed valve position profile. A weight of zero indicates that one hundred percent of valve control will be due to a feedback signal from the superheat control unit. Accordingly, the starting method of the invention comprises, for example, a period beginning at compressor startup and ending one hundred eighty seconds later. During such period, the position of the expansion valve 36 is independent of the temperature sensed at sensors 41 and 43 in FIG. 4, for example. Accordingly, the control unit 34c will follow a so-called open loop profile based on the previous operating cycle temperature sensed by sensor 43 and the position of the valve 36 at compressor shutdown. Thus, a feedback control algorithm is gradually phased in over time as indicated by the "weight" column. Moreover, as indicated by the table of FIG. 7, a startup profile in accordance with the invention includes parameters of relative position and valve control due to the fixed profile, or not. Also, the "weight" at time equal zero must be one hundred and the "weight" must be zero by the end of the one hundred eighty second startup period.

A preferred embodiment of an expansion valve, such as expansion valve 36, 36a and 36b, may be one commercially available, such as a model CAM from Fujikoki or a model UKV from Saginomiya. The control unit or controller 34, 34a or 34c is capable of modulating the stepper motor type expansion valve 36, 36a or 36b in one of at least three operating modes where the control unit and the expansion valve and associated sensors are installed in a so-called indoor unit, such as a so-called air handler or encased heat exchanger, including the evaporator 12. Alternatively, for a system operating in a heating mode, the controller or control unit and an expansion valve may be installed in an outdoor unit, such as illustrated in FIGS. 2 and 3. For operation in both heating and cooling mode, the expansion valve and control unit would be installed between the indoor unit and outdoor unit, typically, with pressure and temperature sensors installed on the common compressor suction line(s), such as conduit 30.

Figure 8:
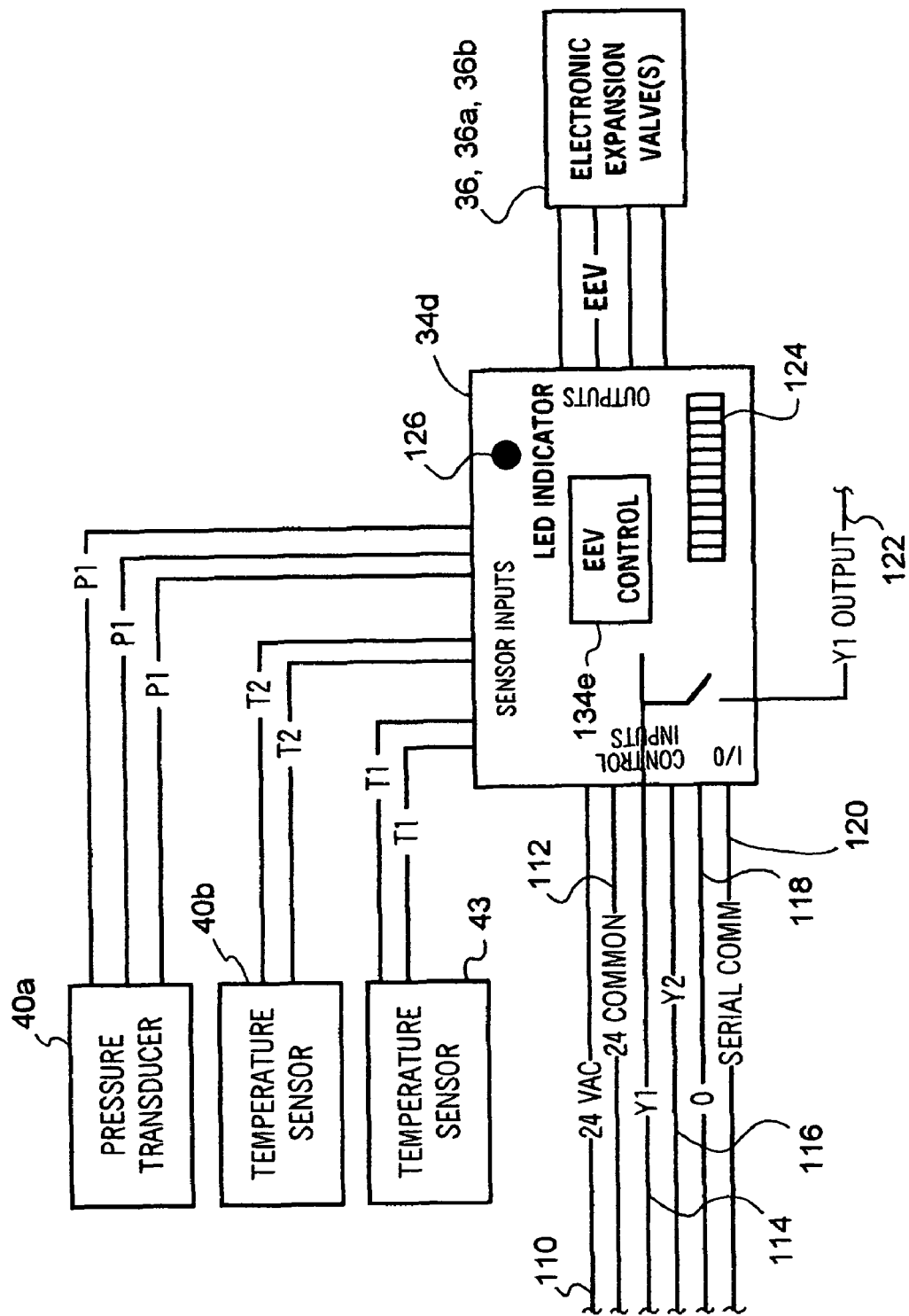
FIG. 8 is a block diagram of an expansion valve controller illustrating respective input and output signal paths.

Referring to FIG. 8, there is illustrated a more detailed diagram of a control unit or controller for operating the motor controlled expansion valves of the present invention. In a conventional application for residential or commercial air conditioning apparatus provided with 24 volt AC electrical power, the control unit 34, 34a or 34c may be installed as a stand-alone device capable of sensing standard 24 volt air conditioning apparatus control signals such as by monitoring a call for startup of a compressor at a Y1 or Y2 line or conductor, plus a signal to the switchover or reversing valve provided by conductor O for establishing the mode of operation and the compressor status. The designations Y1, Y2 and O are in keeping with HVAC equipment code standards prescribed by the American National Standards Institute. Based on compressor status, the control unit 34, 34a or 34c will modulate the position of the expansion valve to control superheat. Alternatively, the control unit 34, 34a and 34c may be installed as a subordinate to a master controller enabling communication between the controller and the master controller.

The control unit illustrated schematically in FIG. 8 is designated by the numeral 34d, for convenience and corresponds to control units 34, 34a and 34c. Control unit 34d includes circuitry for receiving a twenty-four volt AC power supply via conductors 110 and 112, and signals via conductor 114 and conductor 116 corresponding to the so-called Y1 and Y2 signals and a signal indicating the position of a switchover or reversing valve via conductor 118, otherwise known as the valve control signal O together with a serial communication conductor 120. Control unit 34d is operable to output a signal via conductor 122 to control the operation of a compressor such as the compressor 26. Control unit 34d is suitably operably connected to expansion valve 36, 36a or 36b and is operable to receive input signals from a pressure transducer such as transducer or sensor 40a and temperature sensor 40b, as well as a temperature sensor 43 or 38. A series of DIP switches 124, jumpers or other means may be provided to configure a microprocessor 134e of the controller or control unit 34d with respect to such parameters as refrigerant type, size of the motor operated expansion valve, low stage capacity for a multi-stage system, high stage capacity, and applications such as cooling mode, heating mode or dual mode, for example. Output signals are, of course, available for signaling the compressor via conductor 122, the expansion valve, as indicated, and, preferably, a light signal, such as a LED indicator 126, for use in diagnostic indications. The sensors 40b and 43 may be of a type commercially available and suitable for use with refrigerants R22 and R410A, for example.

Referring briefly to FIG. 9, there is illustrated a diagram of the change in the evaporator temperature to reach a predetermined amount of superheat, such as 10° F., versus the current superheat condition as measured by the sensors connected to the control unit. Accordingly, the control unit 34, 34a, 34b, 34c or 34d may be programmed to compare current superheat conditions and using data represented by the line 125 in FIG. 9, adjust the position of the motor operated expansion valve to maintain a predetermined amount of superheat, such as the referenced 10° F. However, to further simplify the method of the invention, the change in evaporator temperature required to reach 10° F. superheat may be set to a constant value.

The construction and operation of the various embodiments of the invention described hereinabove, are believed to be within the purview of one skilled in the art based on the foregoing description. Commercially available components may be used to construct the various embodiments of the apparatus described herein and the control units 34, 34a, 34b, 34c, and 34d may also be constructed utilizing control circuitry including programmable microcontroller or microprocessor type devices known to those skilled in the art. Although preferred embodiments of the invention have been described in detail, those skilled in the art will also recognize that various substitutions and modifications may be made without departing from the scope and spirit of the appended claims.

What is claimed is:

1. A method of controlling an expansion valve of a residential HVAC system, comprising:
   in response to at least one of a call for cooling and a call for heating, controlling the expansion valve to achieve a first predetermined position, wherein the controlling is achieved without respect to a superheat of the HVAC system occurring substantially contemporaneously with the controlling;
   wherein the first predetermined position is a predetermined percentage greater than a previous position of the expansion valve achieved (1) during operation of the expansion valve in response to at least one of a previous call for cooling and a previous call for heating and (2) during control of the expansion valve as a function of the superheat of the HVAC system occurring substantially contemporaneously with the at least one of the previous call for cooling and the previous call for heating, and wherein the predetermined percentage is the product of multiplying a substantially constant multiplying factor against the previous position of the expansion valve; and
   after achieving the first predetermined position, controlling the expansion valve according to a weighted function that increasingly depends upon a function of a substantially contemporaneous superheat of the HVAC system.

2. The method of claim 1, wherein the previous position of the expansion valve is a position in which the expansion valve was last operated prior to the at least one of the call for cooling and the call for heating.

3. The method of claim 1, wherein the controlling of the expansion valve as a function of the superheat of the HVAC system comprises adjusting the expansion valve to achieve a desired superheat value.

4. The method of claim 1, wherein the first predetermined position is relatively more open than the previous position.

5. The method of claim 1, further comprising:
   maintaining the expansion valve in the first predetermined position for a first predetermined period of time.

6. The method of claim 5, further comprising:
   causing the expansion valve to achieve a second predetermined position in response to expiration of the first predetermined period of time.

7. The method of claim 5, further comprising:
   causing the expansion valve to achieve a second predetermined position after expiration of the first predetermined period of time.

8. The method of claim 7, further comprising:
   maintaining the expansion valve in the second predetermined position for a second predetermined period of time.

9. The method of claim 7, wherein the second predetermined position is relatively less open than the first predetermined position.

10. The method of claim 1, further comprising:
    after achieving the first predetermined position, controlling the expansion valve as a function of at least one of a substantially contemporaneously sensed pressure of the HVAC system and a substantially contemporaneously sensed temperature of the HVAC system.

11. The method of claim 1, wherein the expansion valve is an electronically controlled motor driven expansion valve.

12. A method of controlling an expansion valve of a residential HVAC system, comprising:
    providing an open loop profile for controlling the expansion valve without feedback related to a superheat of the HVAC system, wherein the open loop profile comprises multiplying a substantially constant multiplying factor that is not dependent upon any previous positions of the expansion valve against a previous position of the expansion valve;
    providing a feedback control algorithm for controlling, to the exclusion of the open loop profile, the expansion valve as a function of at least one of a substantially contemporaneously measured temperature of the HVAC system and a substantially contemporaneously measured pressure of the HVAC system; and
    operating the expansion valve in response to at least one of a call for cooling and a call for heating, the operating comprising:
       controlling the expansion valve according to the open loop profile;
       controlling the expansion valve as a weighted function of both the open loop profile and the feedback control algorithm; and
       controlling the expansion valve according to the feedback control algorithm.

13. The method of claim 12, wherein the open loop profile comprises a first predetermined position of the expansion valve and an associated first predetermined time.

14. The method of claim 13, wherein the open loop profile comprises a second predetermined position of the expansion valve and an associated second predetermined time.

15. The method of claim 13, wherein the expansion valve is controlled as the weighted function of both the open loop profile and the feedback control algorithm after controlling the expansion valve according to at least a portion of the open loop profile and wherein an open loop weight value is positive while a feedback control algorithm weight is also positive.

16. The method of claim 15, wherein the open loop weight is decreased over a period of time and wherein the feedback control algorithm weight is increased over the same period of time.

17. The method of claim 14, wherein at least one of the first predetermined position and the second predetermined position are predetermined relative to a previous position of the expansion valve achieved during operation of the expansion valve in response to at least one of a previous call for cooling and a previous call for heating.

18. The method of claim 17, wherein at least one of the first predetermined position and the second predetermined position is greater than the previous position.

19. A method of controlling an expansion valve of a residential HVAC system, comprising:
    in response to a first call operation of the HVAC system to meet a first call temperature demand, at least partially controlling the expansion valve in response to at least one of (1) a first call temperature that is related to a first call superheat of the HVAC system and (2) a first call pressure that is related to the first call superheat, the at least one of the first call temperature and the first call pressure occurring during operation of the HVAC system to meet the first call temperature demand;
    discontinuing the first call operation;

in response to a subsequent call operation of the HVAC system to meet a subsequent call temperature demand, controlling the expansion valve according to an open loop profile for a first subsequent period in which a subsequent call superheat is substantially ignored, wherein the open loop profile comprises multiplying a substantially constant multiplying factor that is not dependent upon any previous positions of the expansion valve against a previous position of the expansion valve; and after the first subsequent period, controlling the expansion valve for a second subsequent period according to a weighted function of both (1) the open loop profile and (2) a feedback control algorithm in which the subsequent call superheat is not substantially ignored.

20. The method of claim 19, further comprising:

after the second subsequent period, controlling the expansion valve according to the feedback control algorithm while substantially ignoring the open loop profile.

21. The method of claim 20, wherein ignoring the subsequent call superheat comprises ignoring subsequent call temperatures related to the subsequent call superheat and ignoring subsequent call pressures related to the subsequent call superheat.

22. The method of claim 21, wherein controlling the expansion valve according to the feedback control algorithm comprises controlling the expansion valve to achieve a predetermined subsequent call superheat value.

23. The method of claim 22, wherein the expansion valve is controlled to achieve the predetermined subsequent call superheat value until the subsequent call temperature demand has been met.

24. The method of claim 23, wherein each of the open loop profile and the feedback control algorithm are associated with positive value weights during control of the expansion valve according to the weighted function.

* * * * *